United States Patent
Makino et al.

(10) Patent No.: US 11,664,561 B2
(45) Date of Patent: May 30, 2023

(54) CYLINDRICAL SECONDARY CELL AND A METHOD OF ITS MANUFACTURE

(71) Applicant: Northvolt AB, Stockholm (SE)

(72) Inventors: Tetsuya Makino, Solna (SE); Brendan Sexton, Västerås (SE); Kenya Shatani, Stockholm (SE); Marouene Ben Messaoud, Hagersten (SE)

(73) Assignee: NORTHVOLT AB, Stockholm (SE)

( * ) Notice: Subject to any disclaimer, the term of this patent is extended or adjusted under 35 U.S.C. 154(b) by 0 days.

(21) Appl. No.: 17/721,906

(22) Filed: Apr. 15, 2022

(65) Prior Publication Data

US 2022/0344788 A1 Oct. 27, 2022

(30) Foreign Application Priority Data

Apr. 22, 2021 (SE) .................... 2150504-5

(51) Int. Cl.
*H01M 50/559* (2021.01)
*H01M 50/54* (2021.01)
(Continued)

(52) U.S. Cl.
CPC ..... *H01M 50/559* (2021.01); *H01M 10/0422* (2013.01); *H01M 10/0587* (2013.01); *H01M 50/107* (2021.01); *H01M 50/533* (2021.01); *H01M 50/54* (2021.01); *H01M 50/583* (2021.01)

(58) Field of Classification Search
CPC .. H01M 50/559; H01M 50/54; H01M 50/583; H01M 10/0422; H01M 50/107; H01M 50/533; H01M 10/0587
See application file for complete search history.

(56) References Cited

U.S. PATENT DOCUMENTS

2004/0023108 A1  2/2004  Nakanishi et al.
2006/0078787 A1  4/2006  Sato et al.
(Continued)

FOREIGN PATENT DOCUMENTS

EP  2182566 A1  5/2010
JP  2000-048795 A  2/2000
(Continued)

OTHER PUBLICATIONS

Swedish Search Report for Swedish Patent Application No. 2150504-5, dated Jan. 18, 2022, (9 pages), Swedish Patent and Registration Office, Stockholm, Sweden.

(Continued)

*Primary Examiner* — Lingwen R Zeng
(74) *Attorney, Agent, or Firm* — Alston & Bird LLP

(57) ABSTRACT

This disclosure presents an electrode lead plate (6) for a cylindrical secondary cell (1) comprising a terminal part (4) and an electrode roll (3) comprising a conductive sheet (3*a*). The electrode lead plate (6) comprises an inner contact region (6*c*) configured to be arranged in direct electrical contact with the terminal part (4) and an outer contact region (6*e*) configured to be arranged in direct electrical contact with the conductive sheet (3*a*), wherein the inner contact region (6*c*) is recessed in relation to the outer contact region (6*e*). Further, a terminal part (4) and a cylindrical secondary cell (1), as well as uses and methods of manufacture, are presented.

12 Claims, 5 Drawing Sheets

(51) Int. Cl.
  *H01M 50/583* (2021.01)
  *H01M 10/04* (2006.01)
  *H01M 50/107* (2021.01)
  *H01M 50/533* (2021.01)
  *H01M 10/0587* (2010.01)

(56) References Cited

U.S. PATENT DOCUMENTS

| | | |
|---|---|---|
| 2008/0131769 A1 | 6/2008 | Sato et al. |
| 2009/0274949 A1* | 11/2009 | Meguro ............... H01M 50/10 429/56 |
| 2010/0330402 A1 | 12/2010 | Wang et al. |
| 2012/0279053 A1 | 11/2012 | Kusama et al. |
| 2017/0373339 A1 | 12/2017 | Cho et al. |
| 2019/0006776 A1 | 1/2019 | Newman et al. |
| 2020/0313151 A1* | 10/2020 | Haraguchi .......... H01M 50/531 |
| 2021/0210792 A1 | 7/2021 | Mukai et al. |
| 2021/0210813 A1* | 7/2021 | Sun ................... H01M 10/0525 |
| 2021/0305655 A1 | 9/2021 | Jang et al. |
| 2022/0344721 A1 | 10/2022 | Makino et al. |

FOREIGN PATENT DOCUMENTS

| | | |
|---|---|---|
| JP | 4612321 B2 | 1/2011 |
| JP | 5218565 B2 | 6/2013 |
| KR | 10-2019-0125664 A | 11/2019 |
| WO | WO-2019/194182 A1 | 10/2019 |
| WO | WO-2021/020743 A1 | 2/2021 |

OTHER PUBLICATIONS

International Search Report and Written Opinion for International Application No. PCT/EP2022/060224, dated Sep. 6, 2022, (14 pages), European Patent Office, Rijswijk, Netherlands.

International Search Report and Written Opinion for International Application No. PCT/EP2022/060226, dated Sep. 8, 2022, (12 pages), European Patent Office, Rijswijk, Netherlands.

NonFinal Office Action for U.S. Appl. No. 17/659,416, dated Jul. 13, 2022, (11 pages), United Stated Patent and Trademark Office, US.

* cited by examiner

CYLINDRICAL SECONDARY CELL AND A METHOD OF ITS MANUFACTURE

CROSS-REFERENCE TO RELATED APPLICATIONS

The present application claims priority to and the benefit of Swedish Patent Application No. 2150504-5, filed Apr. 22, 2021, the entire contents of which as are hereby incorporated by reference herein.

BACKGROUND

Related Field

The present disclosure generally pertains to cylindrical secondary cells and methods of manufacture of cylindrical secondary cells and components thereof. The disclosure further relates to an electrode lead plate and a terminal part for a cylindrical secondary cell.

Related Art

In addressing climate change, there is an increasing demand for rechargeable batteries, e.g. to enable electrification of transportation and to supplement renewable energy. Currently, lithium-ion batteries are becoming increasingly popular. They represent a type of rechargeable battery in which lithium ions move from the negative electrode to the positive electrode during discharge and back when charging.

As the demand for rechargeable batteries increases, more and more focus is being placed on production speed. To achieve an effective production of rechargeable batteries, the design of the batteries as well as their manufacturing process can be optimized.

A rechargeable battery, often referred to as a secondary battery, typically comprises one or more secondary cells electrically connected to each other.

BRIEF SUMMARY

It is in view of the above considerations and others that the embodiments of the present invention have been made. The present disclosure aims at providing highly reliable secondary cells that are efficient in manufacture. The number of components is to be reduced and the assembly thereof is to be simplified.

According to a first aspect of the present disclosure, an electrode lead plate for a cylindrical secondary cell is provided. The electrode lead plate comprises a terminal part and an electrode roll that comprises a conductive sheet. The electrode lead plate is configured to be arranged in direct electric contact with both the terminal part and the conductive sheet. The electrode lead plate comprises an inner contact region configured to be arranged in direct electrical contact with the terminal part and an outer contact region configured to be arranged in direct electrical contact with the conductive sheet. The outer contact region radially surrounds the inner contact region.

Since the electrode lead plate directly electrically contacts the terminal part and the conductive sheet, the terminal part and the conductive sheet are efficiently and reliably contacted to one another. Direct electrical contact means direct electrical and physical contact. The electrode lead plate may be one single component electrically coupled between the conductive sheet and the terminal part. In other words, the electrode lead plate may be the only component electrically coupled between the conductive sheet and the terminal part. Thereby, the number of components of the cylindrical secondary cell is kept low, and its manufacture involves few steps.

The electrode lead plate may have the general shape of a circular disc. The outer contact region may be annular. The inner contact region may be circular.

The electrode lead plate may comprise a fuse region arranged between the inner contact region and the outer contact region. In other words, the current that passes from the conductive sheet of the electrode roll to the terminal part passes through the fuse region. The fuse region may be adapted to break, i.e. burn out, when a predetermined current passes through the fuse region. In this way, the electrode lead plate not only provides a current path between the conductive sheet and the terminal part, but also provides a fuse function.

The fuse region may be annular. The outer contact region may encircle the fuse region that may encircle the inner contact region. The outer contact region, the fuse region and the inner contact region may be concentric.

The fuse region may comprise a current conducting area that is selectively decreased by an indentation formed in the electrode lead plate. Such an indentation may be formed on one or both end surfaces of the electrode lead plate. An indentation may provide a fuse region in a simple and space-efficient manner. The indentation may encircle the inner contact region.

The fuse region may comprise at least one through-hole formed through the electrode lead plate, such that at least one fuse element is formed in the electrode lead plate. The fuse element forms a current conducting area. Such at least one though-hole may provide a well-defined fuse region, that may be precisely adapted to break at a specific current.

The fuse region may comprise both an indentation and a through-hole. For example, there may be three elongated through-holes that form three bridges between the inner and outer regions. The bridges thus form fuse elements. The bridges may comprise indentations. The through-holes may be circular. In alternative, there may be two or four through-holes, forming two or four bridges, respectively.

The inner contact region may be configured such that the terminal part, for example in the form of a pin, may be attached thereto by welding or soldering. The inner contact region may for example be flat and of a dimension that is adapted to an end of the terminal part.

The inner contact region may be recessed in relation to the outer contact region. In other words, the inner and outer contact regions may extend in parallel planes that are distanced from one another. The planes may be parallel with the general extension of the electrode lead plate, and may be distanced along an axis that is normal to both planes.

When the inner contact region is recessed, the terminal part may extend through the outer contact region and be attached to the cylindrical secondary cell by deformation of the terminal part. The terminal part may be a rivet. The rivet may comprise a factory rivet head arranged on the outside of the cylindrical secondary cell to provide an external terminal. The rivet may further comprise a shop rivet head arranged on the inside of the cylindrical secondary cell. The shop rivet head may be accommodated by the recessed inner contact region.

The inner and outer contact regions $6c$, $6e$ may be radially separated from one another. A radial separation enables the arrangement a fuse region between the inner and outer contact regions $6c$, $6e$. Further, such a radial separation enables the inner contact region 6c being recessed in relation to the outer contact region 6e.

The electrode lead plate may comprise a number of electrolyte flow holes. The electrolyte flow holes may allow electrolyte to flow through the electrode lead plate. The electrolyte flow holes may be arranged in a pattern on the electrode lead plate, which pattern allows welding the electrode lead plate to the conductive sheet by a plurality of non-intersecting straight weld lines that extend across the electrode lead plate. The weld lines may for example be laser weld lines.

Weld lines that extend across the electrode lead plate, i.e. from one side to the other, may be beneficial in rigidly attaching the electrode lead plate to the conductive sheet of the electrode roll. Further, as compared for example to radial weld lines that extend between an outer edge of the electrode lead plate and a central point of the electrode lead plate, weld lines that extend across the electrode lead plate may be cost-efficient in manufacture.

The pattern may be configured such that a number of essentially parallel weld lines may be positioned next to each other across the electrode lead plate. The weld lines may be positioned essentially evenly, i.e. at essentially regular mutual distances, next to each other. Such weld lines may result in an even force distribution at the interface between the electrode lead plate and the conductive sheet.

The above-mentioned number of essentially parallel weld lines may be referred to as a first set of weld lines. The pattern may be configured such that a second set of weld lines may be arranged on the electrode lead plate, which second set corresponds to the first set but extends at an angle with respect to the first set. In addition, the pattern may be configured such that a third set of weld lines may be arranged on the electrode lead plate, which second set corresponds to the first and second sets but extends at an angle with respect to the first and second sets. The angle between angularly adjacent sets may be approximately 60 degrees.

The pattern may comprise a number of electrolyte flow hole groups, each flow hole group comprising at least one flow hole. The electrolyte flow hole groups may be arranged such that a straight weld line may be positioned between two neighboring electrolyte flow hole groups wherein at least four weld lines may extend across the electrode lead plate with one electrolyte flow hole group arranged between each weld line. For example, there may be five or six such weld lines.

The pattern may be arranged on the outer contact region. The pattern may comprise electrolyte flow holes that are positioned essentially equidistant from one another on the outer contact region. The electrolyte flow holes may be positioned essentially equidistant from one another and from the delimits of the outer contact region.

The pattern may have the form of a six-pointed star. Such as form may allow a plurality of weld lines as described above and may allow essentially equidistant electrolyte flow holes. There may be twelve electrolyte flow holes. A six-pointed star pattern may also be referred to as a pattern including an inner hexagonal pattern of electrolyte flow holes and an including an outer hexagonal pattern of electrolyte flow holes, the inner and outer patterns being rotated approximately 30 degrees with respect to one another.

The electrolyte flow holes may be arranged in a alternative patterns on the electrode lead plate, which patterns allows welding the electrode lead plate to the conductive sheet by a plurality of non-intersecting straight weld lines that extend across the electrode lead plate.

Alternative patterns may involve the electrolyte flow holes being arranged in an inner square pattern and an outer square pattern. The inner and outer square patterns being rotated approximately 45 degrees with respect to one another. In another example the electrolyte flow holes are arranged in an inner pentagonal pattern and an outer pentagonal pattern. Thus, may be eight or ten electrolyte flow holes.

According to a second aspect of the present disclosure, a method of manufacturing a cylindrical secondary cell is provided. Such a cylindrical secondary cell may comprise an electrode lead plate, a terminal part and an electrode roll comprising a conductive sheet. The method comprises arranging the electrode lead plate in direct electrical and physical contact with the terminal part and with the conductive sheet.

The advantages and further steps of such a method will become clear to persons skilled in the art studying the above first aspect of the present disclosure that relates to an electrode lead plate for a cylindrical secondary cell. For example, the method may involve riveting the rivet and welding the electrode lead plate. The method of the second aspect may, but need not, involve an electrode lead plate according to the first aspect. For example, the method need not involve an electrode lead plate comprising inner and outer contact regions, as described in connection with the first aspect.

According to a third aspect of the present disclosure, a use of an electrode lead plate to connect a conductive sheet of an electrode roll of a cylindrical secondary cell to a terminal part of the cylindrical secondary cell is provided. The use involves arranging the electrode lead plate in direct electrical and physical contact with the conductive sheet and with the terminal part.

The advantages and further steps of such a use will become clear to persons skilled in the art studying the above first aspect of the present disclosure that relates to an electrode lead plate for a cylindrical secondary cell. The use of the third aspect may, but need not, involve an electrode lead plate of the first aspect. For example, the use need not involve an electrode lead plate comprising inner and outer contact regions, as described in connection with the first aspect.

According to a fourth aspect of the present disclosure, a terminal part for a cylindrical secondary cell is provided. The cylindrical secondary cell comprises an electrode lead plate. The terminal part comprises a first terminal part end forming an external terminal of the cylindrical secondary cell and a second terminal part end configured to be arranged in direct electrical contact with the electrode lead plate. The terminal part ends may be positioned at opposite ends of the terminal part.

The terminal part may be attached to the electrode lead plate. The terminal part may act as an external terminal of the cylindrical secondary cell and seal the cylindrical secondary cell.

The terminal part may comprise electrically isolating means surrounding at least a portion of the terminal part.

The terminal part may comprise a head portion and a shaft portion and the electrically isolating means may surround the shaft part. The terminal part may be a rivet with a factory rivet head, a rivet shaft that is adapted to extend through a wall of the cylindrical secondary cell and, after riveting, form a shop rivet head. A rivet may be advantageous in tightly and cost-effectively sealing the cylindrical secondary cell. The electrically isolating means may cost-efficiently be provided as separate parts that jointly electrically isolate the rivet from the wall of the cylindrical secondary cell.

The electrically isolating means may comprise a first portion that extends between the head portion and the cylindrical secondary cell, more precisely between the head portion and a wall of the cylindrical secondary cell. The electrically isolating means may further comprise and a second portion that surrounds the shaft part.

In addition, the electrically isolating means may comprise a third portion that extends along the electrode lead plate. More precisely, the third portion may extend inside the cylindrical secondary cell between the electrode lead plate and a wall of the cylindrical secondary cell.

The first portion of the electrically isolating means may have the form of a disc, for example a circular disc, with a central through-hole for the terminal part. The first portion of the electrically isolating means may thus be annular. The second portion of the electrically isolating means may be cylindrical. The third portion of the electrically isolating means may be annular. Such portions of the electrically isolating means may be cost-effective in production and assembly.

The first and second portions of the electrically isolating means may be separate parts. Such parts may be especially cost-effective in production and assembly. Also the third portion of the electrically isolating means may be a separate part. The first, second and third portions may be provided not only to electrically isolate the terminal part from a cylindrical enclosure of the cylindrical secondary cell, but also to provide a sealing hindering leakage of electrolyte.

According to a fifth aspect of the present disclosure, a terminal arrangement for a cylindrical secondary cell is provided. The cylindrical secondary cell comprises an electrode lead plate and an electrode roll. The terminal arrangement comprises the electrode lead plate and the above-described terminal part. It follows that the terminal arrangement may comprise the above-described electrical isolating means.

According to a sixth aspect of the present disclosure, a method of manufacturing a cylindrical secondary cell is provided. The cylindrical secondary cell comprises a terminal part and an electrode lead plate. The method comprises arranging the terminal part in direct electrical contact with the electrode lead plate. The terminal part and the electrode lead plate may be of the types described above. Thus, the terminal part may be a pin or a rivet. The method may comprise welding the electrode lead plate to an inner end surface of the pin or the rivet, i.e. to the rivet shop head.

According to a seventh aspect of the present disclosure, a use of a terminal part to form an external terminal of a cylindrical secondary cell is provided. The terminal part is arranged in direct electrical contact with an electrode lead plate of the cylindrical secondary cell. The terminal part, the electrode lead plate and the cylindrical secondary cell may be of the types described above. Thus, the terminal part may be a pin or a rivet.

According to an eight aspect of the present disclosure, a cylindrical secondary cell is provided. The cylindrical secondary cell comprises an electrode roll comprising a conductive sheet, an electrode lead plate configured to be arranged in direct electrical contact with the conductive sheet, and a terminal part forming an external terminal of the cylindrical secondary cell and configured to be arranged in direct electrical contact with the electrode lead plate. The electrode roll may comprise another conductive sheet that is in electrical contact with another external terminal of the cylindrical secondary cell. The electrode lead plate and the terminal part may be of the types described above.

According to a ninth aspect of the present disclosure, a method of manufacturing the cylindrical secondary cell of the preceding paragraph is provided. The method comprises arranging the electrode lead plate in direct electrical contact with the terminal part and with the conductive sheet.

BRIEF DESCRIPTION OF THE DRAWINGS

The embodiments disclosed herein are illustrated by way of example, and by not by way of limitation, in the figures of the accompanying drawings. Like reference numerals refer to corresponding parts throughout the drawings, in which.

DETAILED DESCRIPTION OF VARIOUS EMBODIMENTS

Embodiments of the present disclosure will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art.

Figure 1:
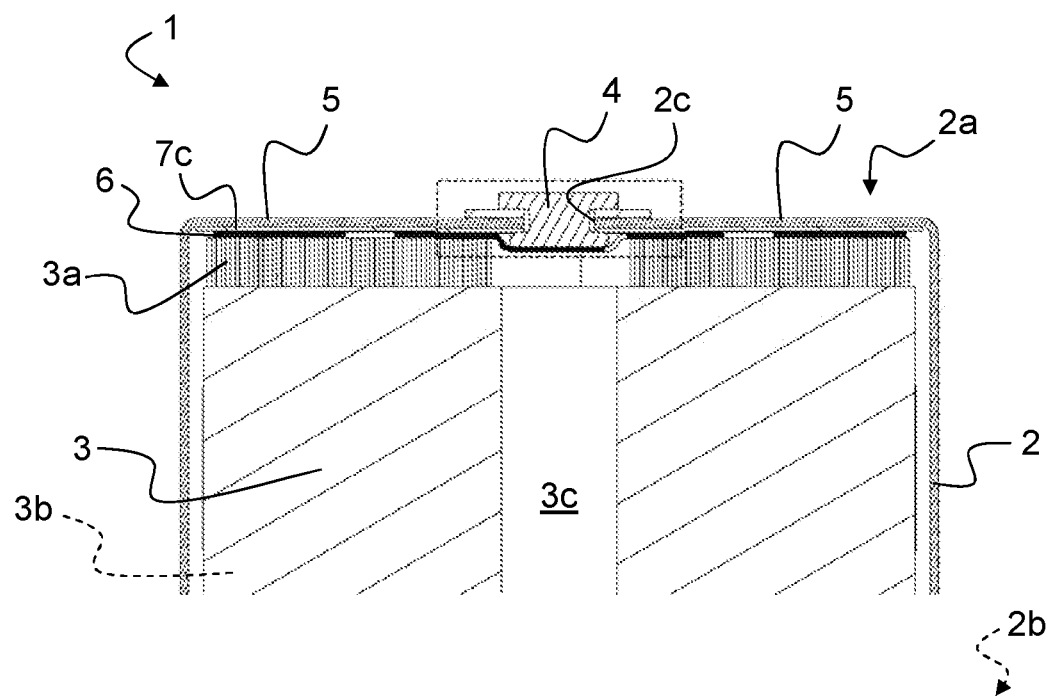
FIG. 1 shows, in cross-section, a first end of a cylindrical secondary cell.

FIG. 1 shows a first embodiment of a cylindrical secondary cell 1 (hereinafter referred to as cell) that comprises a cylindrical enclosure 2 with a first enclosure end 2a (the top end in FIG. 1) and an opposite second enclosure end 2b (not shown). The cylindrical enclosure 2 may also be referred to as a can. Inside the cylindrical enclosure 2, an electrode roll 3 is contained. The first enclosure end 2a may be formed in one piece with the cylindrical enclosure 2 (as illustrated in FIG. 1) and the second enclosure end 2b may be formed by a separate second enclosure end lid (not shown), or vice versa. Both enclosure ends 2a, 2b may in alternative be formed by respective lids.

The first and (briefly described) second embodiments of the cell 1 relate to a cell 1 of a type that has both a positive terminal 4 and a negative terminal 5 at one and the same end (the top end in FIG. 1) of the cylindrical secondary cell 1. The first enclosure end 2a comprises a central terminal through-hole 2c for the positive terminal 4. The negative terminal 5 is electrically connected to the cylindrical enclosure 2. More precisely, the negative terminal 5 is formed by the top surface of the cylindrical enclosure 2 that surrounds the terminal through-hole 2c. Thus, the entire cylindrical enclosure 2 (apart from the positive terminal 4 at the top end) may be the negative terminal.

A cylindrical secondary cell having both terminals 4, 5 at one end may bring advantages as regards electrically connecting the cell to a load. Conductors electrically connecting the terminals to the load may be positioned on the same end, the terminal end, of the cell. The opposite end, the electrolyte-filling end, of the cell may be dedicated to electrolyte filling and gas venting. In the present disclosure, the electrolyte filling end is not described in detail. An overpressure may be generated within the cell during operation, in particular upon malfunction of the cell or of the load connected to the cell. Such malfunction may require a release of gas and/or electrolyte out of the cell, and it may be advantageous to direct the released gas and/or electrolyte away from the conductors.

For example, a number of cells may be positioned at a low position in an electric vehicle. The cells may be arranged with the terminal ends directed upwards and the electrolyte-filling ends directed downwards. Upon malfunction, for example resulting from a faulty electric vehicle charger or a faulty cell, a release of gas and/or electrolyte from the electrolyte-filling end(s) will be advantageously directed downwards towards the ground beneath the vehicle.

The electrode roll 3 comprises a first and a second conductive sheet 3a, 3b and separating means (not shown). The separating means may also be termed separator. The conductive sheets 3a, 3b and the separating means are rolled to form a circular cylindrical roll defining a central channel 3c. The sheets 3a, 3b are coated with electrode coatings and on assembly of the cell 1 the cylindrical enclosure 2 is filled with an electrolyte. The electrolyte may flow through the central channel 3c or conduit. The coatings on the conductive sheets 3a, 3b act as cathode and anode, respectively. The cathode, anode and electrolyte provide electrochemical energy storage. This principle is known per se, and the electrode roll 3 is commonly referred to as a jellyroll.

The sheets 3a, 3b of the electrode roll 3 are axially offset in relation to one another, and each comprises an end section that is not coated with electrode coating. In FIG. 1, only one end of the electrode roll 3 is shown, and at this end the first conductive sheet 3a protrudes axially from the electrode roll 3. At the opposite end (not shown) of the electrode roll 3 the second conductive sheet 3b protrudes axially. The second electrode roll 3b is schematically indicated by a dashed arrow in FIG. 1.

In FIG. 1, the upper end of the first conductive sheet 3a is not coated with electrode coating. Similarly, although not shown, the lower end of the second conductive sheet 3b is not coated with electrode coatings. In this way, the respective ends of the electrode roll 3 may be efficiently electrically connected to a respective assigned terminal 4, 5 of the cell 1. This design is known per se and commonly referred to as a tabless cell.

In this disclosure, only the connection between one of the conductive sheets 3a, 3b and one of the terminals 4, 5 will be discussed in detail. The other one of the conductive sheets 3a, 3b is electrically connected to the other one of the terminals 4, 5 in a manner not discussed in detail herein.

Figure 2:
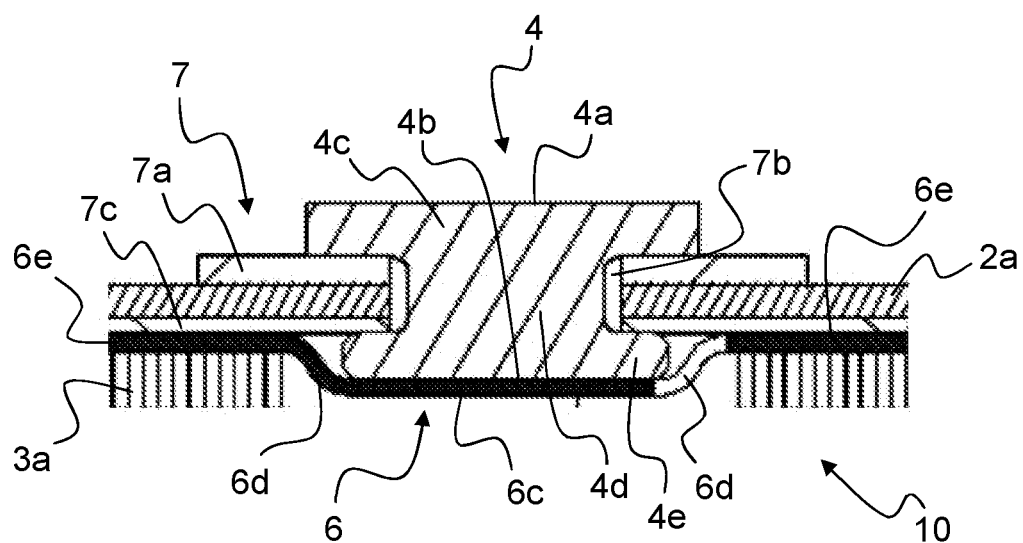
FIG. 2 is an enlarged cut-out of FIG. 1.

As is illustrated in FIGS. 1 and 2, the cell 1 comprises an electrode lead plate 6 that is arranged at the upper end of the electrode roll 3. The electrode lead plate 6 is in direct electrical contact with the first conductive sheet 3a, more precisely with the non-coated end section of the first conductive sheet 3a. The electrode lead plate 6 is in direct electrical and direct physical contact with the first conductive sheet 3a. The electrode lead plate 6 may be attached, for example welded, for example laser welded, to the first conductive sheet 3a.

The cell 1 further comprises a terminal part 4. In the embodiments of the present disclosure, the terminal part is rotational symmetric around its longitudinal center axis (not illustrated). The terminal part 4 extends through the first enclosure end 2a and has an outer, or first, end 4a and an inner, or second, end 4b. The outer end 4a of the terminal part 4 may form the first terminal of the cell 1. As is shown in FIG. 1, the terminal part 4 is in direct electrical contact with the electrode lead plate 6. The terminal part 4 is in direct electrical and physical contact with the electrode lead plate 6. More precisely, the inner end 4b of the terminal part 4 is in direct electrical contact with the electrode lead plate 6. The inner end 4b may be attached, for example welded, for example laser welded, to the electrode lead plate 6.

As is best shown in FIG. 2, the terminal part 4 may comprise electrically isolating means 7 surrounding at least a portion of the terminal part 4. In the embodiment of FIGS. 1 and 2, the terminal part 4 has the shape of a rivet with a head portion 4c, or so-called factory rivet head, and a shaft portion 4d, or rivet shaft. In the embodiment of FIGS. 1 and 2, the electrically isolating means is rotational symmetric. As is illustrated, the electrically isolating means 7 surrounds the rivet shaft 4d. The electrically isolating means may be referred to as a rivet gasket.

More in detail, the electrically isolating means 7 may comprise or consist of a first portion 7a that is arranged between the factory rivet head 4c and the first enclosure end 2a and a second portion 7b that surrounds the rivet shaft 4d. The first portion 7a may be an annular disc, with an outer diameter that is larger than the factory rivet head 4c. The inner diameter of the first portion 7a may correspond to the diameter of the rivet shaft 4d. Thus, the first portion 7a may electrically isolate the factory rivet head 4c, more precisely the inner (i.e. towards the cell 1) surface of the factory rivet head 4c, from the first enclosure end 2a.

The rivet shaft 4d extends through a through-hole (the terminal through-hole 2c) in the first enclosure end 2a and is electrically isolated from the through-hole by the second portion 7b of the electrically isolating means 7. In the embodiment of FIGS. 1 and 2 the second portion 7b is circular cylindrical.

During manufacture of the cell 1, the rivet 4 is riveted, thus plastically deformed, such that a portion of the rivet shaft 4d is expanded radially, see especially FIG. 2. The rivet shaft 4d is deformed to form a so-called shop rivet head 4e. The shop rivet head 4e hinders the rivet 4 (that may be referred to as a terminal rivet) from being pulled out of the through-hole in the first enclosure end 2a.

As is illustrated in FIG. 2, the electrically isolating means 7 may comprise a third portion 7c that is arranged between the shop rivet head 4e and the first enclosure end 2a. In addition, the third portion 7c may extend inside the first enclosure end 2a and along the upper surface of the electrode roll 3 to electrically isolate the electrode lead plate 6 from the first enclosure end 2a. The third portion 7c may be an annular disc, with an outer diameter that corresponds to the outer diameter of the electrode lead plate 6 and an inner diameter that corresponds to the diameter of the rivet shaft 4d.

Figure 3:
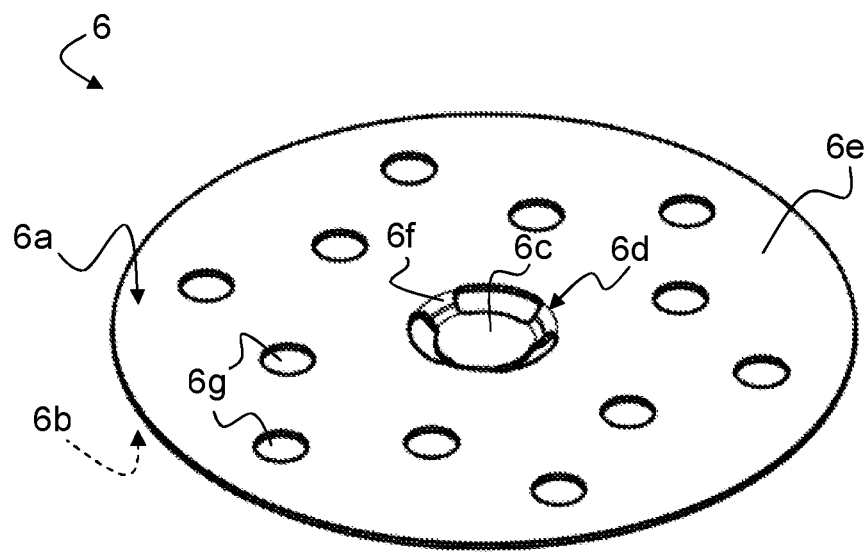
FIG. 3 shows an electrode lead plate.

FIG. 3 shows the electrode lead plate 6 of FIGS. 1 and 2 in more detail. The electrode lead plate 6 of FIG. 3 (and FIGS. 4 to 6) may be used in cylindrical secondary cells and with terminal parts of other design than the ones described herein. The electrode lead plate 6 of the first embodiment is configured to be arranged in direct electrical contact with a conductive sheet 3a of an electrode roll 3 and in direct electrical contact with a terminal part 4. The electrode roll may be a tabless electrode roll. The terminal part 4 may form an external terminal of the cell 1.

The electrode lead plate 6 of FIG. 3 comprises a first end surface 6a and an opposite second end surface 6b. When assembled, the first end surface 6a faces away from the electrode roll 3 and the second end surface 6b faces the electrode roll 3. In FIG. 3 (and FIGS. 1 and 2 when the electrode lead plate 6 is mounted in such a cell 1), the first end surface 6a is the upper surface and the second end surface 6b is the lower surface.

The electrode lead plate 6 of FIG. 3 comprises an inner contact region 6c and an outer contact region 6e. The outer contact region comprises a number of electrolyte flow holes 6g, which will be described below. In the present example, the cell 1 is circular cylindrical and the electrode lead plate 6 has the general shape of a circular disc. The inner contact region 6c is configured to be arranged in direct electrical contact with the terminal part 4 and the outer contact region 6e is configured to be arranged in direct electrical contact with the first conductive sheet 3a (see FIG. 2). The inner contact region 6c is circular and the outer contact region 6e is circular annular.

A fuse region 6d is arranged between the inner and outer contact regions 6c, 6e. In the first embodiment, the fuse region 6d comprises three elongate through-holes forming three fuse elements 6f in the form of bridges. The bridges 6f conduct the current between the outer contact region 6e and the inner contact region 6c. Thus, the bridges 6f jointly define a current conducting area that conducts the current between the outer contact region 6e and the inner contact region 6c. The current conducting area may be dimensioned such that the fuse region 6d breaks the current at a predetermined value. Thus, in the event that the current exceeds a predetermined value, the bridges 6f melt, i.e. burn out. Each bridge 6f may be provided with an indentation to decrease the current conducting area. Such indentations, or notches, are illustrated as relatively thick lines connecting the elongate through-holes in FIG. 3, the indentations thus extend across the bridges 6f.

In other words, the width (as seen in a plan view of the upper or lower surface 6a, 6b) of the bridges 6f may be adapted by the size of the elongate through-holes and the thickness of the bridges may be reduced by the indentations.

As is clear from FIGS. 1-3, in the first embodiment of the cell 1 and of the electrode lead plate 6, the inner contact region 6c is recessed in relation to the outer contact region 6e. The annular outer contact region 6a is arranged in a first plane, and the circular inner contact region 6c is arranged in a second plane that is parallel to the first plane. The bridges 6f thus extend both in a radial direction and in an axial direction, connecting the two planes, i.e. the inner contact region 6c and the outer contact region 6e. Thus, the bridges 6f both provide a fuse function and act to position the inner contact region 6c at an axial distance from the outer contact region 6e. In addition, the through-holes that form the bridges may function as electrolyte flow holes.

Turning to FIG. 2, the recessed lead plate 6 facilities the use of a rivet as a terminal element 4. The shop head 4e will occupy some space within the cell 1, which space is provided by electrode lead plate 6 by the inner contact region 6c being recessed. The rivet shop head 4e and the inner contact region 6c may be positioned within the central channel 3c of the electrode roll 3.

Figure 4:
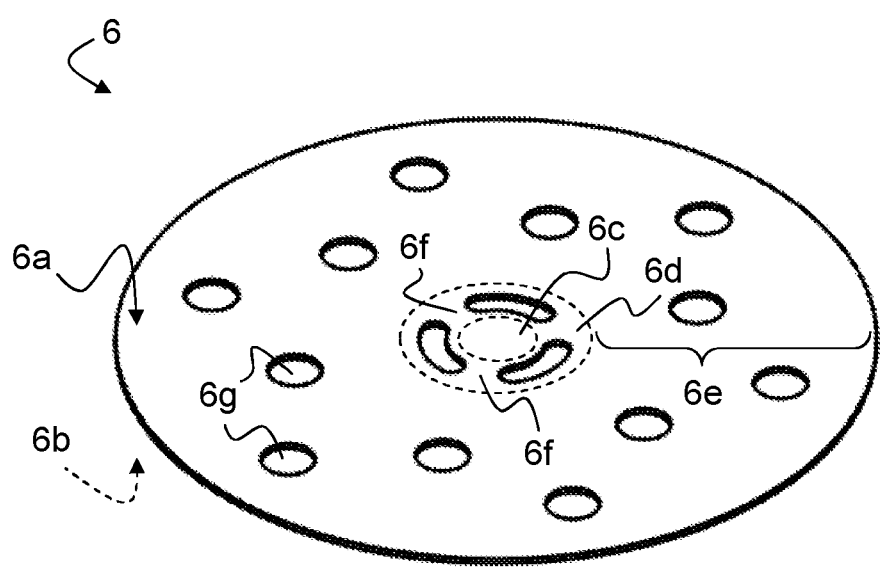
FIG. 4 shows a second embodiment of an electrode lead plate.

FIG. 4 shows an electrode lead plate 6 according to a second embodiment. The electrode lead plate 6 of the second embodiment differs from the one of the first embodiment in that the inner and outer contact regions 6c, 6e are positioned in the same plane. Thus, the electrode lead plate has the form of a circular and flat disc.

A second embodiment of the cell 1, not shown herein, comprises the electrode lead plate 6 of FIG. 4. In such a cell, the terminal element 4 may be a pin, i.e. a structure that includes the head portion 4c (pin head) and the shaft portion 4d (pin shaft). The shaft portion 4d of a terminal element 4 according the second embodiment may be axially shorter than the rivet shaft of the first embodiment. As will become clear from a study of FIGS. 2 and 4 in conjunction, the shaft portion 4d may extend from the head portion 4c, through the electrically isolating means 7 and end at the upper surface 6a of the electrode lead plate 6. During manufacture, the end surface of the shaft portion 4d may be welded to the electrode lead plate 6, more precisely to the inner contact region 6c. The electrically isolating means may be referred to as a pin gasket.

The electrode lead plate 6 according to the second embodiment (FIG. 4) comprises a fuse region 6d that essentially corresponds to the fuse region of the first embodiment (FIG. 3). However, the bridges 6f of the second embodiment do not extend both in the axial direction but only radially, i.e. in-plane with the disc. Further, the bridges of the second embodiment are not furnished with indentations. In a further embodiment (not shown), the bridges 6f of an electrode lead plate 6 corresponding to the one of FIG. 4 may be provided with indentations to reduce the current conducting area.

Figure 5:
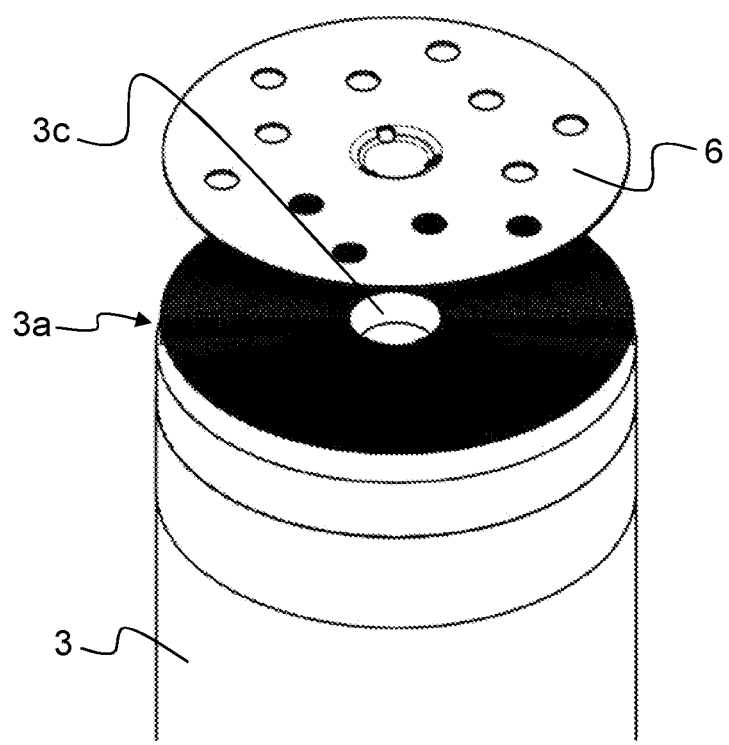
FIG. 5 shows a third embodiment of an electrode lead plate and an electrode roll in exploded view.

FIG. 5 shows a third embodiment of an electrode lead plate 6 and an electrode roll 3 to which the electrode lead plate 6 may be attached. The electrode roll 3 shown in a perspective view on FIG. 5 corresponds to the electrode roll 3 shown in FIGS. 1 and 2.

The electrode lead plate 6 of the third embodiment corresponds to the one of the first embodiment (FIG. 3) apart from the fact that the through-holes that form the bridges 6f are circular instead of elongate. The electrode lead plate 6 of the third embodiment comprises indentations, but an alternative embodiment may lack indentations.

Figure 6:
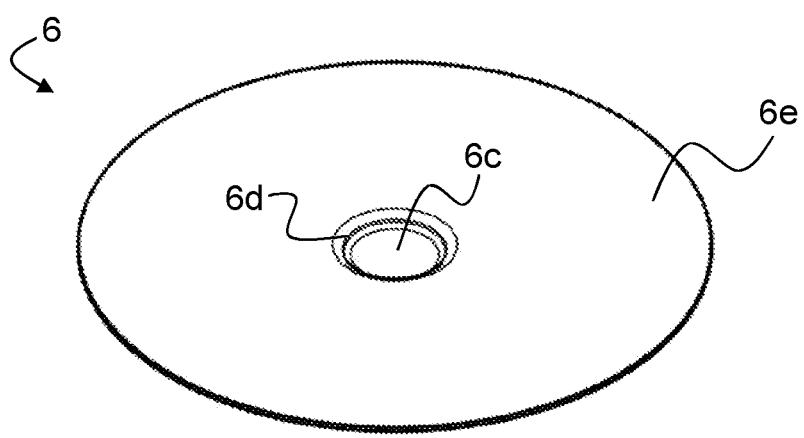
FIG. 6 shows a fourth embodiment of an electrode lead plate.

FIG. 6 shows a fourth embodiment of an electrode lead plate 6. The electrode lead plate of FIG. 6 corresponds to the electrode lead plate of FIG. 3 but lacks through-holes in the fuse region 6d and lacks electrolyte flow holes 6g. Thus, the current conducting area of the fuse region 6d is decreased solely by an indentation. In FIG. 6, the indentation is shown as a circle arranged in the fuse region 6d.

Figure 7:
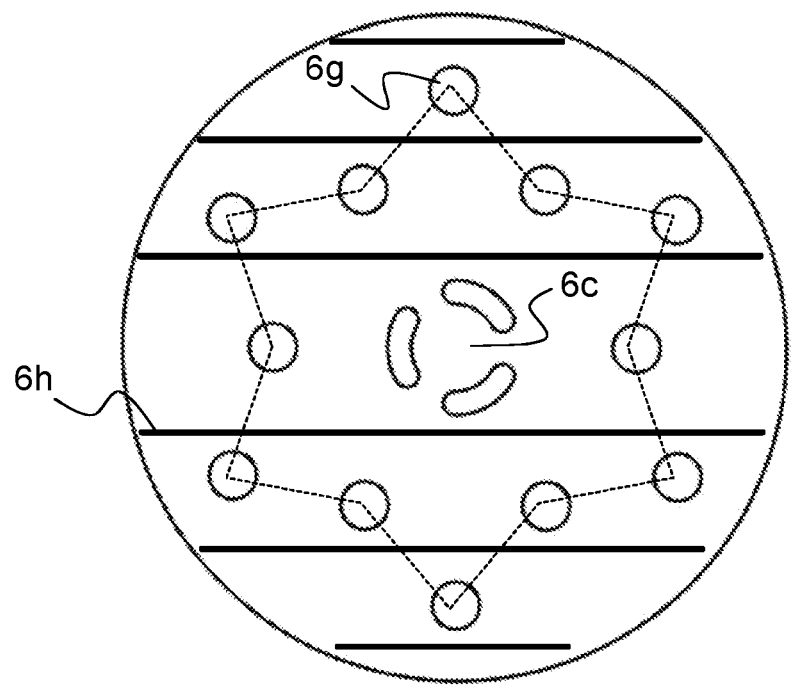
FIG. 7 shows the electrode lead plate of FIG. 4 with a first set of weld lines.

FIG. 7 shows the electrode lead plate 6 of FIG. 4 and illustrates a first set of weld lines 6h and also indicates that the electrolyte flow holes 6g may be arranged in a pattern that has the form of a six-pointed star.

The electrolyte flow holes 6g may be arranged in a pattern on the electrode lead plate 6 that allows welding the electrode lead plate 6 to the conductive sheet 3a of the electrode roll by a plurality of non-intersecting straight weld lines 6h. A first set of such weld lines, consisting of six weld lines, is illustrated in FIG. 7.

In FIG. 7, the electrolyte flow holes 6g may be seen as assigned to five separate electrolyte flow hole groups. One straight weld line 6h extends across the electrode lead plate 6 between each electrolyte flow hole group. In detail, with reference to the orientation of FIG. 7, the top electrolyte flow hole 6g belongs to a first electrolyte flow hole group. The four electrolyte flow holes 6g that are arranged essentially on the same height of the electrode lead plate 6 belong to a second electrolyte flow hole group. The two electrolyte flow holes 6g that are arranged left and right of the inner contact region 6c belong to a third electrolyte flow hole group. The fourth electrode flow hole group corresponds to the second electrolyte flow hole group and finally the bottom electrolyte flow hole 6g belongs to a fifth electrolyte flow hole group.

Through-holes of the fuse region 6d, if present, may be seen as part of the third electrolyte flow hole group.

Figure 8:
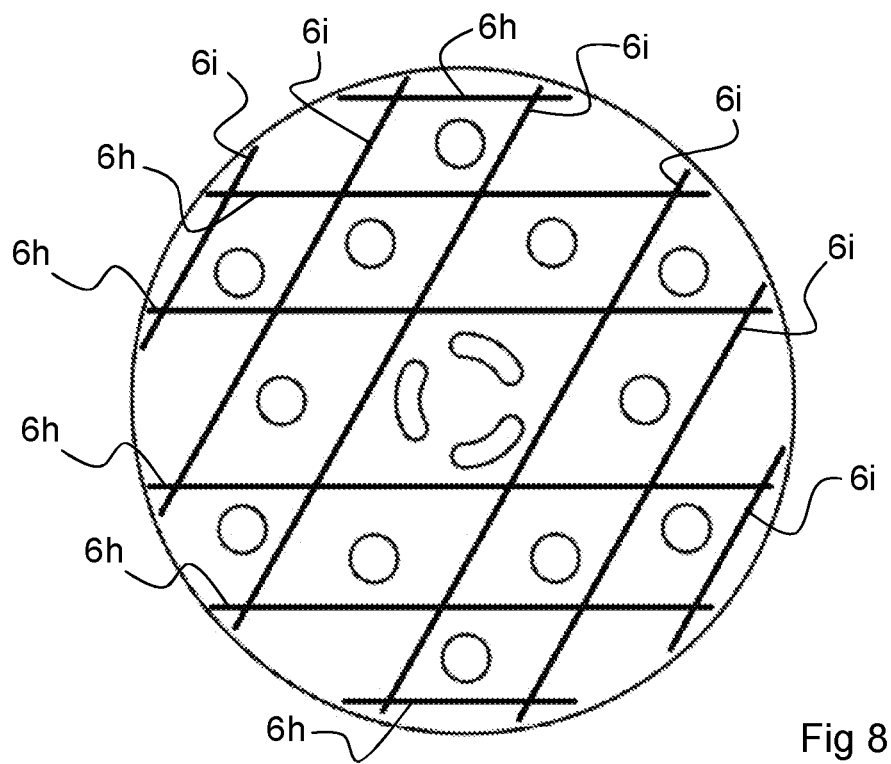
FIG. 8 shows the electrode lead plate of FIG. 4 with a first and a second set of weld lines.

FIG. 8 illustrates a second set of weld lines 6i that is identical to the first set of weld lines 6h but arranged at an angle α of approximately 60 degrees with respect to the first set of weld lines 6h but. As is apprehended from FIG. 8, it is further possible to apply a third set of weld lines (not shown) that are arranged at an angle of approximately 60 degrees with respect to the second set of weld lines 6i.

In the embodiments of the electrode lead plate 6 that comprises electrolyte flow holes 6g, the electrolyte flow holes 6g may be arranged in a pattern that has the form of a hexagram or six-pointed star. In other words, if the twelve electrolyte flow holes 6g are joined by imaginary straight lines drawn from each adjacent electrolyte flow hole 6g to the next along the circumference of the electrode lead plate 6, a six-pointed star if formed. Such a pattern may provide evenly positioned electrolyte flow holes 6g which is beneficial for the electrolyte distribution, and also leave room for uninterrupted weld lines drawn straight and evenly distanced across the electrode lead plate.

Figure 9:
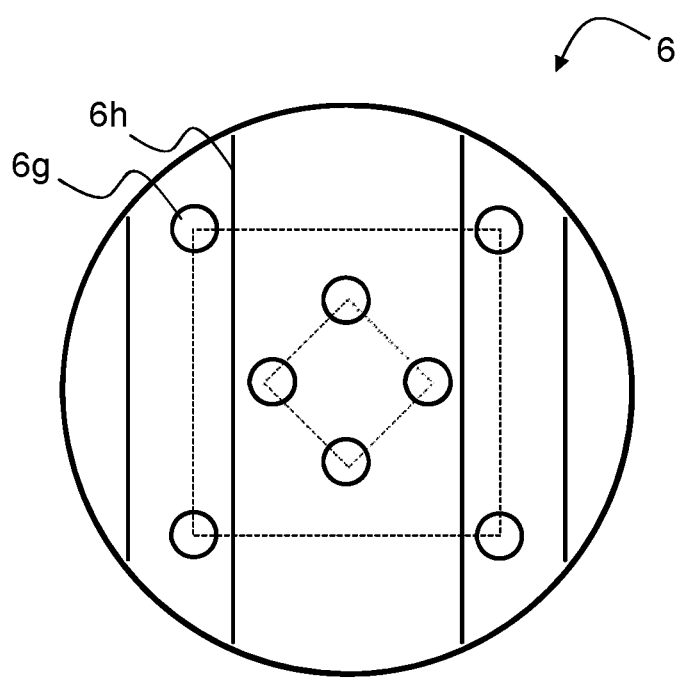
FIG. 9 shows a fifth embodiment of an electrode lead plate.

FIG. 9 shows a fifth embodiment of an electrode lead plate 6 with electrolyte flow holes 6g arranged in an alternative pattern. It is to be understood that the pattern of FIG. 9 is applicable also to the other embodiments of electrode lead plate shown herein (FIGS. 3, 4, 5, 6).

The alternative, or second, pattern of FIG. 9 may be described as the electrolyte flow holes 6g being arranged in an inner square pattern and an outer square pattern. The inner and outer square patterns are rotated approximately 45 degrees with respect to one another. Again, a first set of non-intersecting straight weld lines 6h is illustrated. It is to be under stood that a second set of non-intersecting straight weld lines may also be applied (compare FIG. 8). In the embodiment of FIG. 9, the angle between the two sets may be approximately 90 degrees.

Following the same principle, it is to be understood that yet an alternative pattern may involve an inner pentagonal pattern and an outer pentagonal pattern of electrolyte flow holes 6g.

Turning now to a method of manufacturing a cylindrical secondary cell, such a method may involve welding the electrode lead plate 6 to the electrode roll 3. Laser welding may be employed and a first set of weld lines 6i, as illustrated in FIG. 7, may be applied. It is also possible to apply a second 6h and a third set of weld lines.

Separately, the electrically isolating means 7 (rivet/pin gasket) and the terminal part 4 (rivet/pin) may be attached to the cylindrical enclosure 2. For example, the terminal part 4 may be placed with the shaft portion 4d pointing upwards on a table. Next, the first portion 7a and the second portion 7b of the electrically isolating means 7 may be thread over the shaft portion 4d. These portions 7a, 7b may be provided as one joint part or as low-cost separate parts. The cylindrical enclosure 2 may then be aligned with its first enclosure end 2a facing the table and thread over the shaft portion 4d such that the shaft portion 4d passes through the terminal through-hole 2c. Next, the third portion 7c of the electrically isolating means 7 is thread over the shaft portion 4d such that the third portion 7c rests against the inner surface of the first enclosure end 2a.

In embodiments where the terminal part 4 is a rivet this is now riveted to form the shop rivet head 4e.

The electrode roll 3 with the electrode lead plate 6 is next introduced into the cylindrical enclosure 2 through the second enclosure end 2a, the electrode roll 3 being aligned with electrode lead plate 6 facing the table. Then the inner contact region 6c of the electrode lead plate 6 is attached to the terminal part 4 (inner end face of shop rivet head 4e or inner end face of pin shaft 4d). For example, the inner contact region 6c of the electrode lead plate 6 may be welded to the terminal part 4, the welding may be conducted through the central channel 3c.

The method may further comprise electrically connecting the second conductive sheet 3b to the cylindrical enclosure 2 and closing the second enclosure end 2b in a manner not described herein.

The coating on the first conductive sheet 3a of the electrode roll 3 may be form cathode material and the coating on the second conductive 3b sheet may form anode material. Typically, the conductive sheet of the cathode of a secondary cell comprises aluminium (aluminum in US English) and thus the first conductive sheet 3a may be made of aluminium. Typically, the conductive sheet of the anode side of a secondary cell comprises copper or steel and thus the second conductive sheet 3b may be of copper or steel. As regards the metals listed here, alloys thereof are included. For example, copper is to be construed as including copper alloys, i.e. alloys mainly comprising copper. Similarly, steel is to be construed as including nickel-plated steel.

As it may be advantageous to use the same metal throughout a current path, especially within a battery that contains an electrolyte, the cylindrical enclosure 2 is preferably of the same metal as the second conductive sheet 3b. The cylindrical enclosure 2 may thus be made from copper or steel. This brings the advantage that the cylindrical enclosure 2 may be designed with a thin wall, as compared to a cylindrical enclosure of aluminium as copper and steel have higher tensile strengths than aluminum. Another advantage is that copper and steel both have higher melting points than aluminium, which may increase the safety of the cell 1.

As is clear from the above and also from the figures of the accompanying drawings, the inner and outer contact regions 6c, 6e of the electrode lead plate 6 may be separate regions. In the present embodiments, the inner contact region 6c is radially separated from the outer contact region 6e, see especially FIGS. 3 and 4. The inner and outer contact regions 6c, 6e do not overlap, as seen in a plan view of the electrode lead plate 6. Thus, the inner and outer contact regions 6c, 6e do not radially overlap. A radial separation of the inner and outer contact regions 6c, 6e enables the arrangement of the fuse region. A radial separation of the inner and outer contact regions 6c, 6e enables the inner contact region 6c being recessed in relation to the outer contact region 6e.

As is further clear from the above and also from especially FIGS. 1 and 2, in the present embodiments the inner contact region 6c is arranged in direct electrical with the terminal part 4 and is not arranged in direct electrical contact with the conductive sheet 3a. The outer contact region 6e is arranged in direct electrical contact with the conductive sheet 3a and is not arranged in direct electrical contact with the terminal part 4. Modifications and other variants of the described embodiments will come to mind to ones skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure.

For example, the cylindrical secondary cell is shown as being circular cylindrical. However, other cross-sections, such as a rounded square or a rounded rectangular cross-section, are also conceivable. Furthermore, the anode and the cathode may switch place.

Furthermore, although specific terms may be employed herein, they are used in a generic and descriptive sense only and not for purposes of limitation. Therefore, persons skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference numerals in the claims are provided merely as a clarifying example and should not be construed as limiting the scope of the claims in any way.

The invention claimed is:

1. An electrode lead plate (6) for a cylindrical secondary cell (1) comprising a terminal part (4) and an electrode roll (3) comprising a conductive sheet (3a), the electrode lead plate (6) comprising:
    an inner contact region (6c) configured to be arranged in direct electrical contact with an inner end (4b) of the terminal part (4), and
    an outer contact region (6e) configured to be arranged in direct electrical contact with the conductive sheet (3a), wherein the outer contact region (6e) radially surrounds the inner contact region (6c),
    wherein:
        the inner end (4b) of the terminal part (4) extends in a first plane,
        the inner contact region (6c) extends in a second plane non-intersecting with the first plane,
        the outer contact region (6e) extends in a third plane non-intersecting with the first and second planes, and
        the first plane is intermediate the second and third planes, such that the inner contact region (6c) is recessed in relation to the outer contact region (6e).

2. The electrode lead plate (6) of claim 1, comprising a fuse region (6d) arranged between the inner contact region (6c) and the outer contact region (6e), the fuse region (6d) being adapted to break when a predetermined current passes through the fuse region (6d).

3. The electrode lead plate (6) of claim 2, wherein the fuse region (6d) optionally comprises a current conducting area that is decreased by an indentation formed in the electrode lead plate (6).

4. The electrode lead plate (6) of claim 2, wherein the fuse region (6d) optionally comprises at least one through-hole formed through the electrode lead plate (6) such that at least one fuse element (6f) is formed in the electrode lead plate (6) the fuse element (6f) forming a current conducting area.

5. The electrode lead plate (6) of claim 1, wherein the inner and outer contact regions (6c, 6e) extend in parallel planes that are distanced from one another.

6. The electrode lead plate (6) of claim 1, wherein the outer contact region (6e) is annular and the inner contact region (6c) is circular.

7. The electrode lead plate (6) of claim 1, wherein the terminal part (4) is a rivet and wherein the inner contact region (6c) being recessed provides space to accommodate a rivet head (4e) of said rivet.

8. The electrode lead plate (6) of claim 1, further comprising a number of electrolyte flow holes (6g).

9. The electrode lead plate (6) of claim 1, wherein the holes are arranged in a pattern on the electrode lead plate (6).

10. The electrode lead plate (6) of claim 9, wherein at least one of the pattern has the form of a six-pointed star, or the number of electrolyte flow holes (6g) is twelve.

11. A method of manufacturing a cylindrical secondary cell (1) comprising the electrode lead plate (6) of claim 1, a terminal part (4) and an electrode roll (3) comprising a conductive sheet (3a), wherein the method comprises
    arranging the electrode lead plate (6) in direct electrical contact with the terminal part (4) and with the conductive sheet (3a).

12. A cylindrical secondary cell (1) comprising:
    an electrode roll (3) comprising a conductive sheet (3a), the electrode lead plate (6) of claim 1, and
    a terminal part (4) forming an external terminal of the cylindrical secondary cell (1) and configured to be arranged in direct electrical contact with the electrode lead plate (6).

* * * * *